United States Patent
Matsuhira

(10) Patent No.: US 9,497,126 B2
(45) Date of Patent: Nov. 15, 2016

(54) COMMUNICATION DEVICE AND COMMUNICATION METHOD

(71) Applicant: FUJITSU LIMITED, Kawasaki-shi, Kanagawa (JP)

(72) Inventor: Naoki Matsuhira, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 582 days.

(21) Appl. No.: 14/016,940

(22) Filed: Sep. 3, 2013

(65) Prior Publication Data

US 2014/0003424 A1     Jan. 2, 2014

Related U.S. Application Data

(63) Continuation of application No. PCT/JP2011/055847, filed on Mar. 11, 2011.

(51) Int. Cl.
*H04L 12/701* (2013.01)
*H04L 12/54* (2013.01)
(Continued)

(52) U.S. Cl.
CPC ............ *H04L 47/18* (2013.01); *H04L 47/10* (2013.01); *H04L 47/36* (2013.01); *H04L 47/365* (2013.01); *H04L 49/15* (2013.01)

(58) Field of Classification Search
CPC ..... H04L 47/365; H04L 47/36; H04L 47/10; H04L 47/18; H04L 49/15
USPC ....... 370/227, 230, 252, 310, 392, 400, 428; 709/204, 223, 224, 228, 232, 233, 218; 713/153; 380/277; 711/212, 221
See application file for complete search history.

(56) References Cited

U.S. PATENT DOCUMENTS 8,532,107 B1 * 9/2013 Ghosh ................. H04L 12/4633
                                                     370/392
8,885,495 B1 * 11/2014 Liu ...................... H04B 7/0617
                                                     370/252
(Continued)

FOREIGN PATENT DOCUMENTS

JP    2004-349958    12/2004
JP    2009-232062    10/2009
(Continued)

OTHER PUBLICATIONS

International Search Report mailed Apr. 19, 2011 in corresponding International Application No. PCT/JP2011/055847.
(Continued)

*Primary Examiner* — Alpus H Hsu
*Assistant Examiner* — Camquyen Thai
(74) *Attorney, Agent, or Firm* — Staas & Halsey LLP

(57) ABSTRACT

A communication device includes a packet-length table, a transmitter, a receiver, and a table update unit. The packet-length table stores, in association with an identifier of a network, a length of a packet to be transmitted to a device belonging to the network. The transmitter obtains a length of a packet associated with a network to which a destination device belongs, and transmits a packet whose length is equal to or less than the obtained length of a packet. The receiver receives a message when a length of the packet transmitted to the destination device is greater than a length of a packet that is able to be transmitted to a network included in a route leading to the destination device. The message indicates a maximum packet length. The table update unit updates a packet length associated with a network including the destination device to the maximum packet length.

5 Claims, 19 Drawing Sheets

(51) Int. Cl.
*G06F 15/16* (2006.01)
*G06F 7/544* (2006.01)
*H04L 12/801* (2013.01)
*H04L 12/805* (2013.01)
*H04L 12/933* (2013.01)

(56) References Cited

U.S. PATENT DOCUMENTS

| | | | | |
|---|---|---|---|---|
| 2007/0266143 | A1* | 11/2007 | Zeng | H04L 45/54 709/224 |
| 2009/0225758 | A1 | 9/2009 | Morimoto et al. | |
| 2009/0327422 | A1* | 12/2009 | Katis | H04L 12/1827 709/204 |
| 2010/0306391 | A1* | 12/2010 | Mason | G06F 15/173 709/228 |
| 2011/0271097 | A1* | 11/2011 | Joachimpillai | H04L 69/162 713/153 |
| 2012/0051236 | A1* | 3/2012 | Hegde | H04L 43/10 370/252 |

FOREIGN PATENT DOCUMENTS

| | | |
|---|---|---|
| JP | 2010-515388 | 5/2010 |
| JP | 2010-239293 | 10/2010 |
| WO | 2007/114183 | 10/2007 |
| WO | 2008/080792 | 7/2008 |

OTHER PUBLICATIONS

PCT International Preliminary Report on Patentability mailed Sep. 26, 2013 in corresponding International Application No. PCT/JP2011/055847.

Japanese Office Action mailed Jun. 17, 2014 in corresponding Japanese Patent Application No. 2013-504430.

* cited by examiner

| prefix | Net mask | PMTU |
|---|---|---|
| PREFIX OF NETWORK 2b (10.2.0.0) | /16 | 1500 Byte |
| PREFIX OF NETWORK 2c (10.3.0.0) | /16 | 1400 Byte |
|  |  |  |

FIG. 2

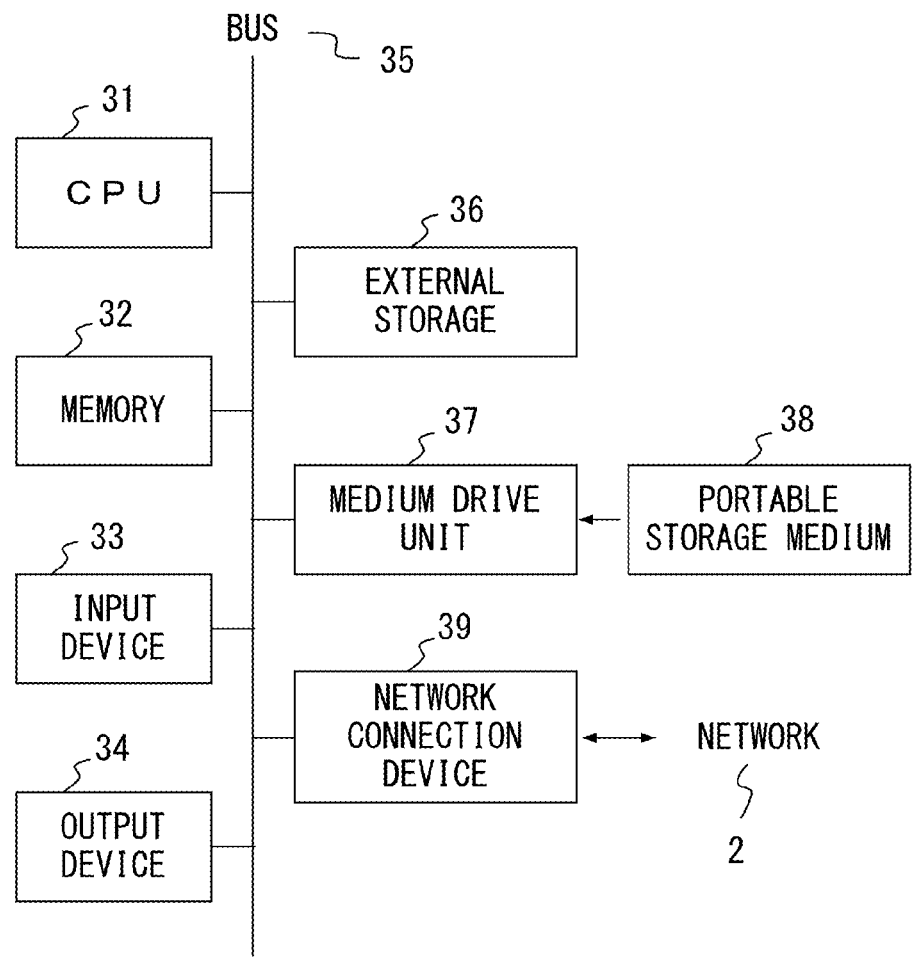
F I G. 4

| prefix | Net mask | PMTU |
|---|---|---|
| PREFIX OF NETWORK 2b (10.2.0.0) | /16 | 1500 Byte |
| PREFIX OF NETWORK 2c (10.3.0.0) | /16 | 1500 Byte |

F I G. 5

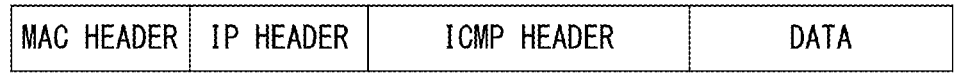
F I G. 6 A
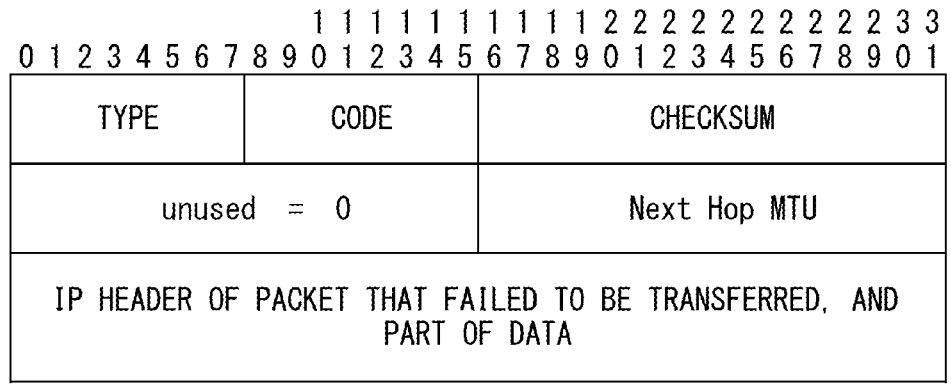
F I G. 6 B
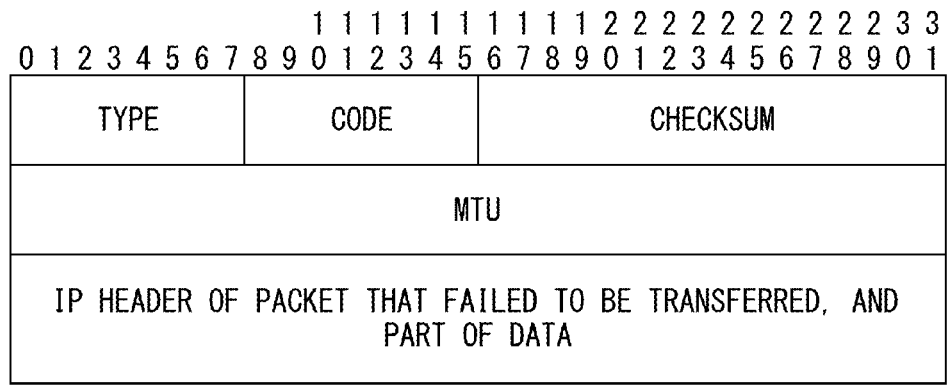
F I G. 6 C

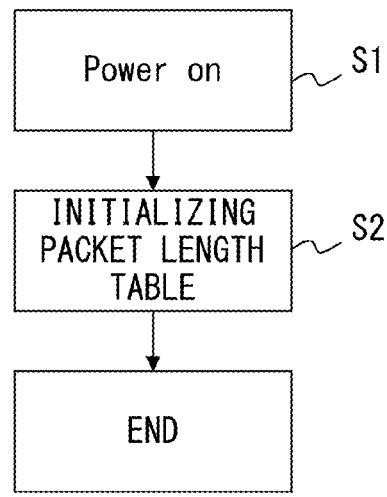
F I G. 7A
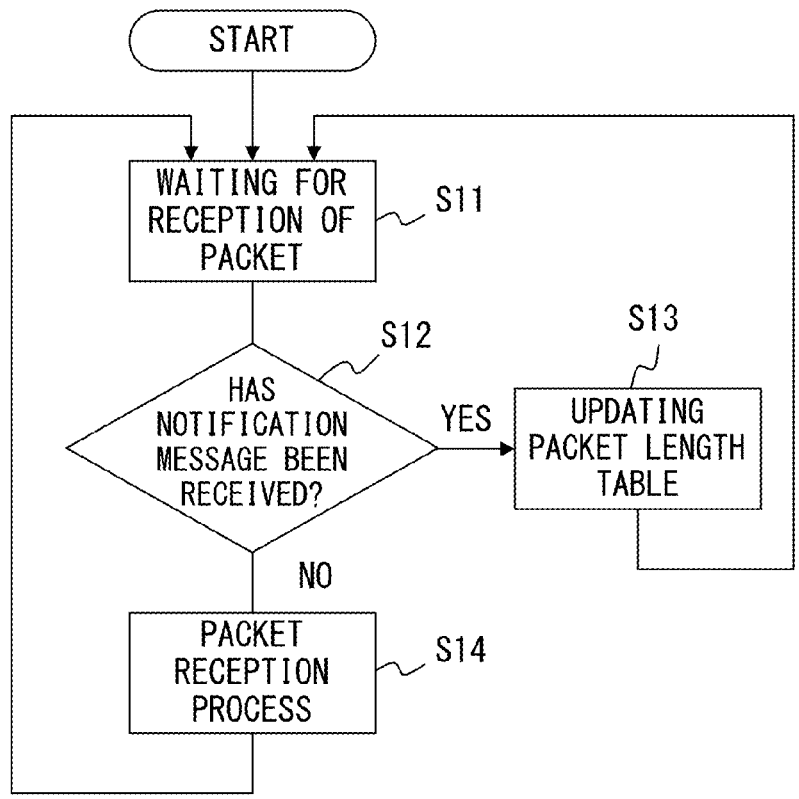
F I G. 7B

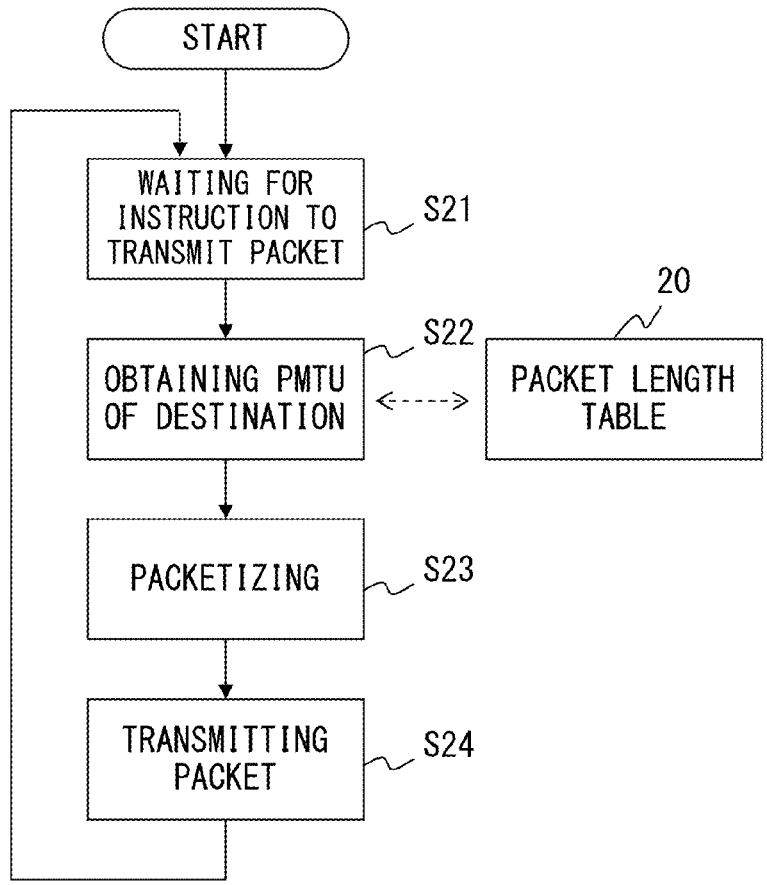
F I G. 8 A
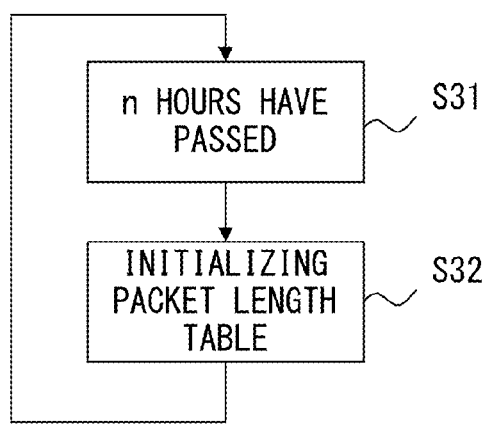
F I G. 8 B

| prefix | Net mask | Tunnel PMTU |
|---|---|---|
| PREFIX OF NETWORK 2h (10.2.0.0) | /16 | 1460 Byte |
| PREFIX OF NETWORK 2i (10.3.0.0) | /16 | 1460 Byte |
| | | |

FIG. 10

| prefix | Net mask | Tunnel PMTU |
|---|---|---|
| PREFIX OF NETWORK 2h (10.2.0.0) | /16 | 1460 Byte |
| PREFIX OF NETWORK 2i (10.3.0.0) | /16 | 1360 Byte |

F I G. 1 3

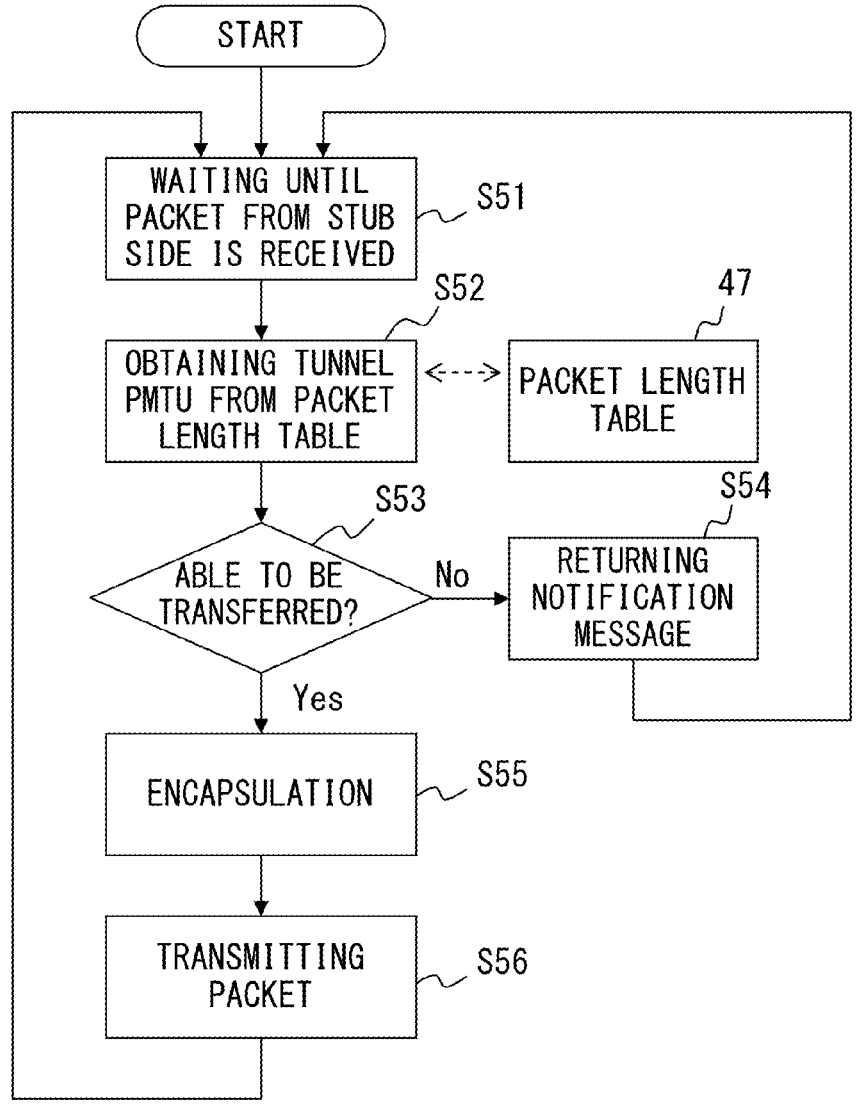
F I G. 1 5

| PREFIX | Net mask | TUNNEL PMTU |
|---|---|---|
| SA46T PREFIX OF NETWORK 2h | /120 | 1460 Byte |
| SA46T PREFIX OF NETWORK 2i | /120 | 1360 Byte |

FIG. 16

| PREFIX | Net mask | TRANSFER DESTINATION IP ADDRESS (NEXT HOP) | Tunnel PMTU |
|---|---|---|---|
| PREFIX OF NETWORK 2h | /120 | IPv6-1 | 1460 Byte |
| PREFIX OF NETWORK 2i | /120 | IPv6-2 | 1360 Byte |
|  |  |  |  |

FIG. 18

COMMUNICATION DEVICE AND COMMUNICATION METHOD

CROSS-REFERENCE TO RELATED APPLICATION

This application is a continuation application of International Application PCT/JP2011/055847 filed on Mar. 11, 2011 and designated the U.S., the entire contents of which are incorporated herein by reference.

FIELD

The embodiments discussed herein are related to a communication device and a communication method achieved by using the communication device.

BACKGROUND

In Internet Protocol (IP) networks such as the Internet, a transmission source device that transmits a packet obtains a maximum packet length when transmitting a packet to a destination device. Here, the maximum packet length corresponds to the maximum value (Path Maximum Transfer Unit, PMTU) for the size of a packet that may be transmitted on the shortest route used when a packet is transmitted from the transmission source device to the destination device. The transmission source device transmits to the destination device a packet whose size is set to the PMTU. Moreover, the transmission source device stores the value of the obtained PMTU in association with the destination device so as to be used for the subsequent transmission of a packet.

As a related technique, a device capable of obtaining a PMTU for every route when there are several routing paths and notifying the transmission source device of the packet of the obtained PMTU has been designed.

CITATION LIST

Patent Documents

[Patent Document 1] International Publication Pamphlet No. 2007/114183

A transmission source device that transmits a packet stores an associated PMTU for every destination device, and thus the entries of the PMTUs stored in the transmission source device increase when the number of destination devices increases. If the number of the stored entries increases, it takes a longer time to search for the entry associated with the destination device of a packet, and thus it takes a long time for the transmission source device to obtain the PMTU associated with a destination device. If it takes a long time to obtain a PMTU, it takes a longer time to generate a packet, thereby requiring a longer time for performing communication.

SUMMARY

A communication device according to an embodiment includes a packet-length table, a transmitter, a receiver, and a table update unit. The packet-length table stores, in association with an identifier of a network, a length of a packet to be transmitted to a device belonging to the network. The transmitter obtains a length of a packet associated with a network to which a destination device belongs from the packet-length table, and transmits a packet whose length is equal to or less than the obtained length of a packet to the destination device. The receiver receives a notification message when a length of the packet transmitted to the destination device is greater than a length of a packet that is able to be transmitted to a network included in a route leading to the destination device. The notification message indicates a maximum packet length corresponding to a maximum length of a packet that is able to be transmitted to the network included in the route. The table update unit updates a packet length associated with a network including the destination device in the packet-length table to the maximum packet length.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of the packet-length table.

FIG. 4 illustrates an example of the hardware configuration of a communication device.

FIG. 5 illustrates an example of the packet-length table.

FIGS. 6A-6C illustrate examples of the configuration of a notification message.

FIGS. 7A and 7B are flowcharts illustrating examples of the operation of a communication device.

FIGS. 8A and 8B are flowcharts illustrating examples of the operation of a communication device.

FIG. 10 illustrates an example of the packet-length table.

FIG. 13 illustrates an example of the packet-length table changed by a table update unit.

FIG. 15 is a flowchart illustrating an example of the operation of a tunnel router.

FIG. 16 illustrates an example of the packet-length table used in the third embodiment.

FIG. 18 illustrates an example of the table in which a packet-length table and a route table are integrated.

DESCRIPTION OF EMBODIMENTS

Figure 1:
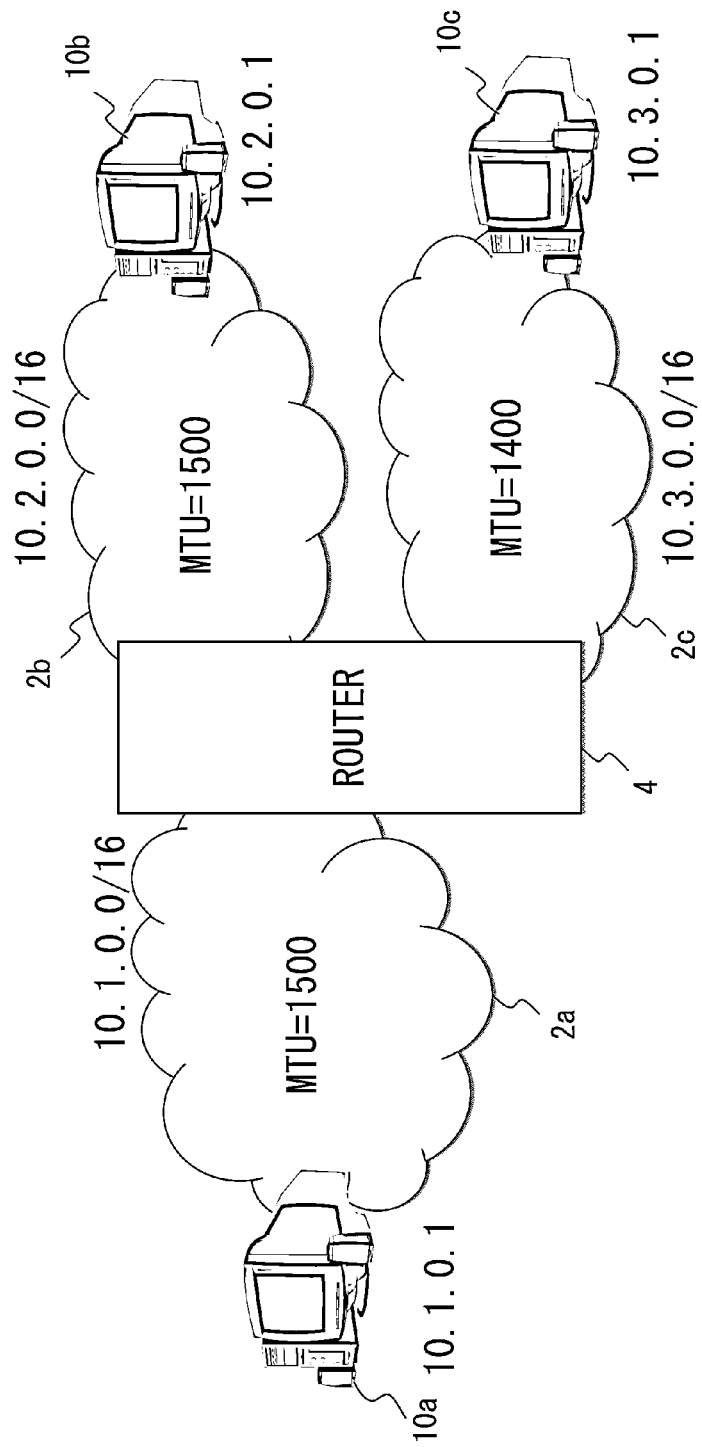
FIG. 1 illustrates an example of the network including a communication device according to an embodiment.

FIG. 1 illustrates an example of the network including a communication device 10 according to an embodiment. The network illustrated in FIG. 1 includes communication devices 10 (10a-10c), a router 4, and networks 2 (2a-2c). In the example of FIG. 1, it is assumed that the IP addresses 10.1.0.1, 10.2.0.1, and 10.3.0.1 are assigned to the communication device 10a, the communication device 10b, and the communication device 10c, respectively. It is also assumed that the prefix of a network 2a to which the communication device 10a belongs is 10.1.0.0/16. Further, it is assumed that the prefixes of a network 2b and a network 2c are 10.2.0.0/16 and 10.3.0.0/16, respectively. It is assumed that the communication device 10b and the communication device 10c belong to the network 2b and the network 2c, respectively. It is assumed that the size of a packet that may be transmitted by each of the networks 2, i.e., an MTU (Maximum Transfer Unit), is 1500 bytes at the networks 2a and 2b, and is 1400 bytes at the network 2c.

The communication device 10a includes a packet-length table 20 as illustrated in FIG. 2. In the packet-length table 20, the prefix of the network 2 to which the destination device of a packet belongs and the size of a packet (PMTU) that may be transmitted on a communication path to the network 2 are associated with each other and stored. For example, when the communication device 10b is the destination device, MTU=1500 bytes in both of the networks 2a and 2b. Accordingly, "PMTU=1500 bytes" is recorded in the packet-length table 20 in association with the network 2b. By contrast, when the communication device 10c is the destination, the MTU of the network 2c is 1400 bytes, and thus a packet length is not transmitted to the network 2c unless the packet length directed from the communication device 10a to the communication device 10c is equal to or less than 1400 bytes. Accordingly, "PMTU=1400 bytes" is recorded in the packet-length table 20 when the destination device belongs the network 2c.

As described above, in the present embodiment, the maximum value of a packet length that may reach the network 2 on a communication path is recorded for each of the networks 2 to which a destination device belongs. Accordingly, the number of entries to be included in the packet-length table 20 decreases compared with the case when one entry is created for every destination device. Accordingly, the number of entries searched by the communication device 10 to obtain a PMTU becomes smaller. In other words, the length of time for which the communication device 10 searches for a PMTU according to a destination device is shortened in the communication device 10 that uses the packet-length table 20.

First Embodiment

Firstly, the communication device 10 according to the first embodiment will be described. In the following description, it is assumed that a packet is not divided at the router 4. For example, when an IPv4 packet is transferred by the router 4, it is assumed that a "Don't Fragment bit" included in the IP header of the packet is set to ON (fragmentation inhibited). Note that a packet which will be transmitted and received in the following description may be an IPv4 packet or an IPv6 packet.

Figure 3:
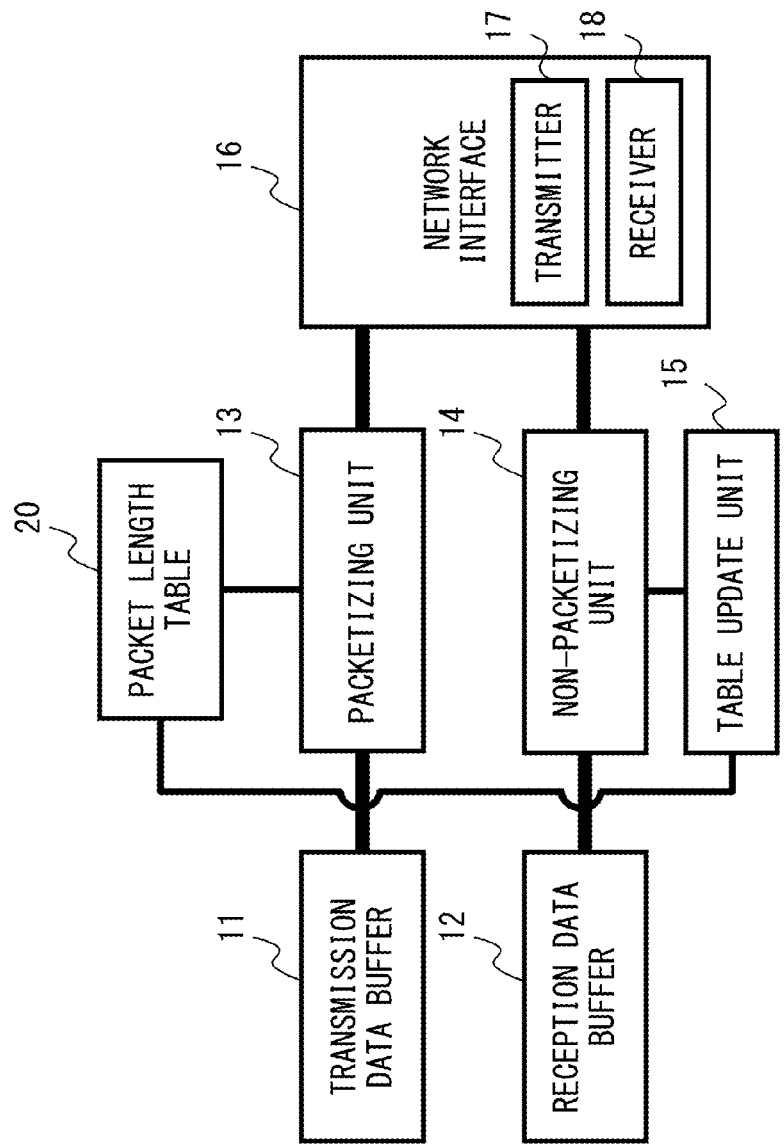
FIG. 3 illustrates an example of the functional composition of a communication device.

FIG. 3 illustrates an example of the functional composition of the communication device 10. The communication device 10 includes a transmission data buffer 11, a reception data buffer 12, a packetizing unit 13, a non-packetizing unit 14, a table update unit 15, a network interface 16, and the packet-length table 20. Here, the network interface 16 includes a transmitter 17 and a receiver 18.

Data to be transmitted to a destination device is temporarily stored in the transmission data buffer 11. The data stored in the transmission data buffer 11 is output to the packetizing unit 13, as deemed appropriate. The reception data buffer 12 stores the data that is obtained from the packet received through the receiver 18. The data stored in the reception data buffer 12 is used for the processes by the communication device 10, as deemed appropriate.

The packetizing unit 13 packetizes the data input from the transmission data buffer 11 into packets with a size equal to or smaller than a PMTU. The packetizing unit 13 uses the destination address of the data as a key to search the packet-length table 20, and obtains a PMTU that is associated with the network 2 of the address matching the routing prefix included in the destination address. The packetizing unit 13 packetizes the data in a size equal to or smaller than the PMTU obtained from the packet-length table 20. The packetizing unit 13 outputs the generated packet to the transmitter 17.

The non-packetizing unit 14 obtains data from the reception packet received through the receiver 18. The non-packetizing unit 14 may store the obtained data in the reception data buffer 12. Further, when the packet received at the receiver 18 is a notification message, the non-packetizing unit 14 outputs the data included in the notification message to the table update unit 15. Note that a notification message provides information such as the fact that a packet length is longer than the packet length that may be transmitted to a destination device, and a maximum packet length corresponding to the largest packet length that may be transmitted to the destination device. For example, an Internet Control Message Protocol (ICMP) error message and a "Packet too big" message from among and ICMPv6 error messages may be used as a notification message. Details about the notification messages will be described later. The table update unit 15 updates the packet-length table 20 according to the data input from the non-packetizing unit 14. The operation of the table update unit 15 will be described later in detail.

FIG. 4 illustrates an example of the hardware configuration of the communication device 10. The communication device 10 includes a CPU 31, a memory 32, an input device 33, an output device 34, a bus 35, an external storage 36, a medium drive unit 37, and a network connection device 39. The CPU 31 operates as the packetizing unit 13, the non-packetizing unit 14, and as the table update unit 15. Further, the CPU 31 controls peripheral devices as deemed appropriate, and executes various kinds of software. The memory 32 operates as the transmission data buffer 11 and the reception data buffer 12, and stores the packet-length table 20. Moreover, the memory 32 stores data or programs used in the processes by the CPU 31, or the like, as deemed appropriate. The input device 33 is, for example, a keyboard or a mouse, and a user may use the input device 33 in order to input data to the communication device 10. The output device 34 displays data or the like as deemed appropriate. The bus 35 connects the CPU 31, the memory 32, the input device 33, the output device 34, the external storage 36, the medium drive unit 37, and the network connection device 39 with each other so as to enable mutual data transfer. The external storage 36 stores a program or data, and provides the information stored in the CPU 31 or the like, as deemed appropriate. The medium drive unit 37 may output the data stored in the memory 32 or the external storage 36 to a portable storage medium 38, and may read a program, data, or the like from the portable storage medium 38. Note that the portable storage medium 38 may be any portable storage medium including a floppy disk, a Magneto-Optical (MO) disk, a Compact Disc Recordable (CD-R), and a Digital Versatile Disk Recordable (DVD-R). The network connection device 39 operates as the network interface 16, and transmits and receives a packet to/from the network 2.

Next, how the packet-length table 20 is created will be described. Here, cases in which the communication device 10a transmits a packet to the communication device 10b and the communication device 10c in the network of FIG. 1, thereby creating the packet-length table 20 of FIG. 2, will be described. In the following description, combinations of letters and numbers such as "packet P1" and "packet P2" are used as the identifiers of packets in order to enable distinctions among packets.

(1) The communication device 10a is connected to the network 2a of MTU=1500 bytes, as illustrated in FIG. 1. In other words, the communication device 10a may transmit a packet whose packet length is up to 1500 bytes to the network 2a to which the communication device 10a belongs. Accordingly, when the power source of the communication device 10a is turned on, in the packet-length table 20, the MTU of the network 2 connected to the communication device 10a is set to the initial value of the PMTU of the network 2, indicating the capability of transmitting a packet from the communication device 10. Here, as illustrated in FIG. 5, the MTU at the network 2a is recorded in association with the prefix of the network 2 including a device to which the communication device 10a may transmit a packet.

(2) It is assumed that the communication device 10a transmits a packet P1 to the communication device 10b. At this time, the packetizing unit 13 of the communication device 10a determines the size of the packet P1 by referring to the packet-length table 20. The packetizing unit 13 uses the destination address of the communication device 10b as a key to search the packet-length table 20, and detects an entry of the network 2 whose network prefix is the same as the routing prefix of the address of the communication device 10b. As illustrated in FIG. 5, prefixes for two networks of the network 2b (10.2.0.0/16) and the network 2c (10.3.0.0/16) are stored in the packet-length table 20. As the address of the communication device 10b is "10.2.0.1", the packet addressed to the communication device 10b is transmitted to the network 2b (10.2.0.0/16). Accordingly, the packetizing unit 13 creates a packet by using the detected PMTU of the network 2b. Here, the packetizing unit 13 of the communication device 10a creates a packet P1 of 1500 bytes, and outputs the created packet P1 to the transmitter 17. The transmitter 17 transmits the packet P1 to the communication device 10b.

(3) When the router 4 receives the packet P1 transmitted from the communication device 10a to the communication device 10b, the router 4 transfers the packet to the network 2b by referring to a routing table (not illustrated). Here, as the MTU of the network 2b is 1500 bytes, the router 4 transfers the packet P1 received from the communication device 10a to the network 2b.

(4) The communication device 10b receives the packet P1 transmitted from the communication device 10a. As the communication device 10a does not receive an error message in regard to the packet P1 that has been transmitted to the communication device 10b, the table update unit 15 does not change the record in the packet-length table 20.

(5) Next, cases in which the communication device 10a transmits the packet P2 to the communication device 10c will be described. The packetizing unit 13 uses the destination address of the communication device 10c as a key to search the packet-length table 20 in a similar manner to the method described in procedure (1), and detects that the communication device 10c belongs to the network 2c. At this point, "PMTU=1500 bytes" is recorded in association with the network 2c, as illustrated in FIG. 5. Accordingly, the packetizing unit 13 creates a packet P2 of 1500 bytes to be transmitted to the communication device 10c. Once the packet P2 created by the packetizing unit 13 is input, the transmitter 17 transmits the packet P2 to the communication device 10c.

(6) When the packet P2 addressed to the communication device 10c is received, the router 4 tries to transfer the received packet P2 to the network 2c. However, the router 4 is unable to transfer the packet P2 to the network 2c because the MTU of the network 2c is 1400 bytes. Accordingly, the router 4 sends a notification message to the communication device 10a indicating that the router 4 has failed to transfer the packet P2.

FIG. 6 illustrates an example of the configuration of a notification message. When the failed-to-be-transferred packet is an IPv4 packet, the router 4 sends an ICMP error message of FIG. 6A to the communication device 10a. An ICMP error message includes a Media Access Control (MAC) header, an IP header, an ICMP header, and data, as illustrated in FIG. 6A. FIG. 6B illustrates an example of the ICMP header and data included in an ICMP error message. The ICMP header of FIG. 6B is used to provide notification indicating that the transfer of an IPv4 packet has failed. Note that a message including the ICMP header of FIG. 6B may be referred to as an "ICMP Fragmentation Needed and DF set message".

An ICMP header includes a type field, a code field, a checksum field, and a next-hop MTU field. In an ICMP error message sent from the router 4, "3" and "4" are assigned to the type field and the code field, respectively. Unused fields are set to "0", and the value of the MTU of the network 2 to which the router 4 tried to transfer a packet is stored in the next-hop MTU field. In this example, 1400 bytes as the MTU of the network 2c is stored. In the body of the ICMP error message, the Internet header of the packet that has failed to be transferred and the leading 64 bits are included.

The IP address of the communication device 10a is assigned to the destination IP address in the IP header of the ICMP error message, and the router 4 sends an ICMP error message to the communication device 10a.

(7) The communication device 10a receives the ICMP error message at the receiver 18. The receiver 18 outputs the ICMP error message to the non-packetizing unit 14, and the non-packetizing unit 14 outputs the information obtained from the ICMP error message to the table update unit 15. As the ICMP error message includes the IP header of a packet that has failed to be transferred, the non-packetizing unit 14 may obtain the destination IP address of the packet that has failed to be transferred. The table update unit 15 recognizes that the transmission of a packet P2 to the communication device 10c has failed by referring to the information input from the non-packetizing unit 14. Further, the table update unit 15 refers to the values recorded in the next-hop MTU field, and recognizes that the maximum value of a packet length (PMTU) that may be transmitted to the communication device 10c as the destination is 1400 bytes.

(8) The table update unit 15 uses the destination IP address of a packet P2 to search for an entry that is associated with the network to which the communication device 10c belongs. The table update unit 15 searches the packet-length table 20 by using the address "10.3.0.1/16" of the communication device 10c, and recognizes that the communication device 10c is included in the network 2c (10.3.0.0/16). Next, the table update unit 15 changes the PMTU associated with the network 2c to 1400 bytes. The packet-length table 20 after the change is illustrated in FIG. 2.

(9) The table update unit 15 changes the packet-length table 20, and then requests the packetizing unit 13 to resend the packet P2. In the following description, the resent packet of the packet P2 will be referred to as a packet P3. Note that the table update unit 15 may notify the packetizing unit 13 of the fact that the packet-length table 20 has been changed.

(10) The packetizing unit 13 obtains the PMTU of the packet P3 to be transmitted to the communication device 10c from the packet-length table 20, in a similar manner to the procedure (5). As the packet-length table 20 has been changed in the procedure (9), here, the network 2c is associated with 1400 bytes. Accordingly, the packetizing unit 13 creates a packet P3 equal to or smaller than 1400 bytes, and outputs the created packet P3 to the transmitter 17. The transmitter 17 transmits the packet to the communication device 10c.

(11) The router 4 receives the packet P3 addressed to the communication device 10c from the communication device 10a. As the packet P3 is equal to or smaller than 1400 bytes, the router 4 may transfer the packet P3 to the network 2c.

(12) The communication device 10c receives the packet P3 through the network 2c.

As described above, the communication device 10 provided with the packet-length table 20 may store the value of the PMTU for every network to which the communication device 10 as the destination belongs. Accordingly, the capacity of the packet-length table 20 becomes smaller compared with when a PMTU is recorded for every communication device 10. Because the size of a packet that may be transmitted from the communication device 10 as the source to the communication device 10 as the destination is determined by referring to the packet-length table 20, after one packet has been successfully sent that size may be set to the packet length of the subsequent packets that may be transmitted.

In the description above, cases in which IPv4 packets are transmitted or received have been described as an example. However, the communication device 10 provided with the packet-length table 20, the table update unit 15, or the like may be used for a network through which an IPv6 packet is transmitted or received. Note, however, that when an IPv6 packet is transmitted or received, a message created by the router 4 when the transfer has failed is changed to an ICMPv6 error message. FIG. 6C illustrates an example of the ICMP header and body included in an ICMPv6 error message. The ICMP header of an ICMPv6 error message includes a type field, a code field, a checksum field, and an MTU field. In an ICMPv6 error message that provides notification that the transmission of a packet has failed, "2" and "0" are assigned to the type field and the code field, respectively. In the MTU field, the value of the MTU of the network 2 to which the router 4 tried to transfer a packet is stored. The body includes the IP header of a failed-to-be-transferred packet and a part of the data. When an ICMPv6 error message is received by the receiver 18 of the communication device 10a, processes similar to those described above in procedures (7)-(12) are performed.

FIG. 7 includes flowcharts illustrating examples of the operation by the communication device 10. FIG. 7A is a flowchart illustrating the operation performed when the communication device 10 is initialized. When the power source of the communication device 10 is turned on, the table update unit 15 initializes the packet-length table 20 (steps S1, S2). In other words, the table update unit 15 regards the MTU of the network to which the communication device 10 is connected as the PMTU, and stores it in the packet-length table 20 in association with the all prefixes stored in a routing table.

FIG. 7B is a flowchart illustrating an example of the operation performed when the communication device 10 has received a packet after the initialization is complete. Once the initialization is complete, the receiver 18 is kept on standby until a packet is received (step S11). Upon receiving a packet, the receiver 18 outputs the received packet to the non-packetizing unit 14. The non-packetizing unit 14 checks whether the input packet is a notification message (step S12). When the input packet is a notification message, the non-packetizing unit 14 outputs the data included in the notification message to the table update unit 15. The table update unit 15 updates the packet-length table 20 by using the data input from the non-packetizing unit 14 (step S13). After that, the processes subsequent to step S11 are repeated. On the other hand, when a packet rather than a notification packet is input to the non-packetizing unit 14, the non-packetizing unit 14 outputs the data included in the packet to the reception data buffer 12. Then, the communication device 10 processes the data stored in the reception data buffer 12, as deemed appropriate (step S14). After that, the processes subsequent to step S11 are repeated.

FIG. 8 includes flowcharts illustrating examples of the operation of the communication device 10. FIG. 8A is a flowchart illustrating an example of the operation when the communication device 10 transmits a packet after the initialization is complete. The packetizing unit 13 is kept on standby until it is instructed to transmit a packet (step S21). When the packetizing unit 13 is instructed to transmit a packet due to the operation by a user or the like, the packetizing unit 13 uses the IP address of the destination as a key to search the packet-length table 20, and obtains a PMTU that is recorded in association with the prefix of the network including the communication device 10 as the destination (step S22). The packetizing unit 13 obtains data from the transmission data buffer 11, and generates a transmission packet by using the PMTU obtained in step S22 (step S23). The packetizing unit 13 outputs the generated packet to the transmitter 17, and then the transmitter 17 transmits the packet to the destination (step S24). After that, the processes in step S20-S24 are repeated.

FIG. 8B illustrates an example of how the packet-length table 20 is managed. The table update unit 15 obtains time information from a timer (not illustrated). Here, it is assumed that the timer is initialized when the packet-length table 20 is initialized, and the value in the timer indicates the elapsed time since the packet-length table 20 is lastly initialized. The table update unit 15 checks whether a specified period (n hours) has passed in the value of the timer (step S31). Here, the specified period may be of any length, and "n" may be any positive integer. When the time information reaches n hours in the timer, the table update unit 15 initializes the packet-length table 20 (step S32). How initialization is performed is similar to that of step S2. The processes in steps S31 and S32 are repeated until the power source of the communication device 10 is cut off.

In the communication device 10 according to the present embodiment, a PMTU is recorded in the packet-length table 20 for every network 2. Accordingly, even when the number of the communication devices 10 that become the destinations with which the communication device 10 communicates is increased, the number of entries in a table where PMTUs are recorded becomes smaller in comparison with a device that records a PMTU for every destination. Accordingly, the length of time it takes to search a PMTU becomes shorter in the communication device 10 compared with a device that records a PMTU for every communication device 10 as the destination. The search of a PMTU is performed every time a server transmits a packet, and thus the reduction in search time contributes to an improvement of the communication performance of the communication device 10. Moreover, as communication is performed by using a PMTU, the efficiency of the communication is improved in the present embodiment, compared with cases in which communication is performed with a packet length less than a PMTU.

For example, it is assumed that data is transmitted from a server that provides service to a million clients. Moreover, it is assumed that the million clients are accommodated in a hundred networks 2. Assuming that an entry is created for every client and a PMTU is stored in such cases as above, a server will have to search for an entry of the destination client from a million entries so as to obtain a PMTU. As the number of entries increases, the length of time it takes to perform one search becomes longer and the search of a PMTU is performed every time the server transmits a packet. Accordingly, an increase in search time causes deterioration in the packet communication performance. By contrast, in the communication device 10 according to the first embodiment, only a hundred entries are created in the packet-length table 20 when a million clients are accommodated in a hundred networks 2. Accordingly, it is possible to search for a PMTU to be used for transmission to the destination client from a hundred entries included in the packet-length table 20 when the communication device 10 tries to transmit data to a client. As described above, it is possible for the communication device 10 to quickly search for a PMTU for the destination client of a packet, compared with a device that stores a PMTU for every client. As a result, the communication performance of the communication device 10 is improved compared with a device that stores a PMTU for every client.

The degree of reduction in memory capacity or improvement in search speed will be described with reference to the networks of FIG. 1. The network of FIG. 1 includes three "/16" networks. There may be about sixty-five thousand hosts at the maximum in a single "/16" network. Accordingly, PMTUs for one-hundred thirty thousand communication devices will be stored at the maximum when a PMTU is stored for every destination device. Here, an IP address of 32 bits is used for one entry, and thus when 8 bits are assigned to the length of a PMTU, one entry will include 40 bits (5 bytes). Accordingly, six-hundred fifty thousand bytes of memory is used to hold a table including about one-hundred thirty thousand entries. However, the communication device 10 uses the packet-length table 20 to store a PMTU for each network, and thus only two entries are to be stored.

In the Internet with IPv4, there may be 2 to the power of 32 (i.e., about four billion three-hundred million) communication devices. If a table in which PMTUs for all the communication devices are to be recorded is created in the above case, the size of such a table will be about 20 GB. On the other hand, the number of full routes (the number of routes) of the Internet is several hundred thousand, and thus the communication device 10 needs to store only two- to three-hundred thousand entries. In other words, even when a PMTU for devices in the entire Internet is to be stored, the communication device 10 needs to store only one in 1400 to 2100 pieces of data compared with the case in which a PMTU is recorded for every destination. In regard to the search speed, the communication device 10 has a 1400 to 2100 times faster search speed for a PMTU in comparison with a communication device that records a PMTU for every destination, thereby improving the communication performance.

In the first embodiment, the communication in the network as illustrated in FIG. 1 has been described as an example for purposes of simplification. However, the number of the routers 4 included in the route connecting the communication devices 10 that transmit and receive data may be changed to any number. In such cases, every time a notification message such as an IMCP error message is received, the table update unit 15 updates the minimum value for the PMTU of the network 2 included between the communication device 10 as the source and the communication device 10 as the destination.

Second Embodiment

In the second embodiment, a tunnel router 40 that stores a PMTU for each network 2 will be described. Note that a communication device that transmits and receives a packet through the tunnel router 40 may be the communication device 10, or may be any communication device 1 for which the packet-length table 20 is not provided. In the following description, cases in which the communication device 1 transmits and receives a packet through the tunnel router 40 will be explained as an example.

The tunnel router 40 performs encapsulation or decapsulation according to the destination to which a packet is transferred. In encapsulation, a new header is added to a packet. The header added in the encapsulation may be, for example, an IPv4 header, or an IPv6 header. On the other hand, in decapsulation, the header added in the encapsulation is removed from the packet. In the following description, the header of a packet before encapsulation will be referred to as an "inner header", and the header added in the encapsulation will be referred to as an "outer header".

When an encapsulation is performed, a packet length increases by the amount of the added outer header. For example, when the outer header is an IPv4 header, the encapsulated packet expands by 20 bytes or more compared with the packet before the encapsulation. In a similar manner, when the outer header is an IPv6 header, the packet length expands by 40 bytes or more. Accordingly, a packet to be encapsulated is transferred to a destination device when the packet to be encapsulated is shorter than the MTU of the network to which the encapsulated packet is transferred, by the length of the outer header added in the encapsulation. The tunnel router 40 according to the second embodiment stores, for every destination network, a value obtained by subtracting the length of an outer header from the PMTU, i.e., the maximum value for the size of a packet that may be transmitted on a communication path up to the destination network to which the encapsulated packet is transferred. Note that a value obtained by subtracting the length of an outer header from the PMTU up to the destination network to which the encapsulated packet is transferred may be referred to as "Tunnel PMTU" (Tunnel Path Maximum Transfer Unit) in the following description. As will be described later, the tunnel router 40 checks whether it is possible to transmit the encapsulated packet to the network 2 as the destination by comparing the length of a packet to be encapsulated with the Tunnel PMTU before the packet is encapsulated.

Figure 9:
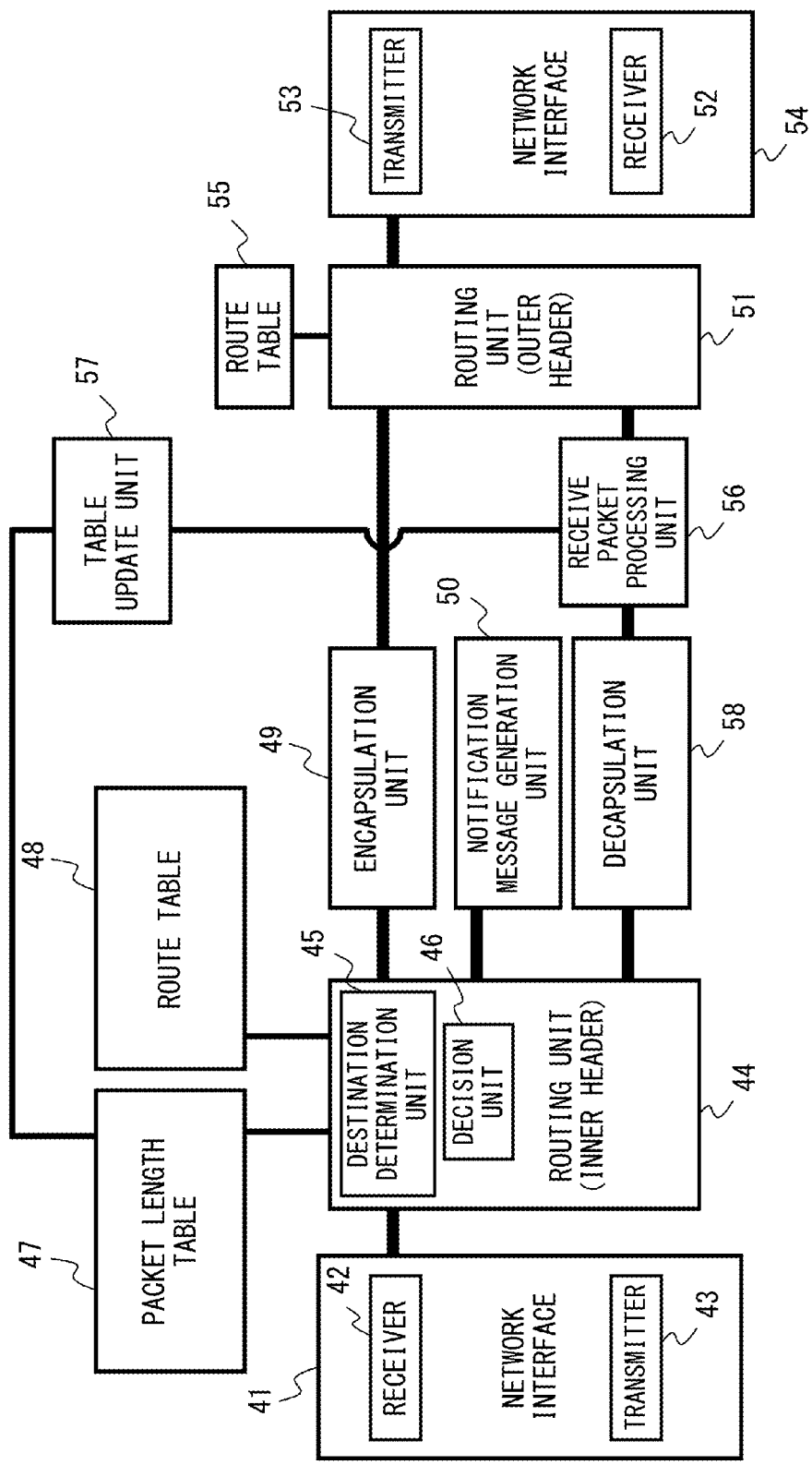
FIG. 9 illustrates an example of the functional composition of a tunnel router.

FIG. 9 illustrates an example of the functional composition of the tunnel router 40. The tunnel router 40 includes network interfaces (41, 54), routing units (44, 51), a packet-length table 47, route tables (48, 55), an encapsulation unit 49, a notification message generation unit 50, a receive packet processing unit 56, a table update unit 57, and a decapsulation unit 58. The network interface 41 includes a receiver 42 and a transmitter 43. The network interface 54 includes a receiver 52 and a transmitter 53. The routing unit 44 includes a destination determination unit 45 and a decision unit 46. In the examples below, it is assumed that the network interface 41, the routing unit 44, and the route table 48 are used for the routing with an inner header. On the other hand, the routing unit 51, the network interface 54, and the route table 55 are used for the routing with an outer header.

In the following description, it is assumed that the address of a transfer destination router, the information of a transfer destination network, or the like are stored in the route tables 48 and 55 for every destination network. Moreover, it is assumed that the information of a transfer destination network includes the information used when the routing unit 44 determines whether or not to encapsulate a packet to be transferred to the network, such as the information of protocols used in the transfer destination network.

The network interface 41 includes the receiver 42 and the transmitter 43. The receiver 42 receives a pre-encapsulated packet, and outputs the received pre-encapsulated packet to the routing unit 44. The transmitter 43 outputs a packet to be transferred without being encapsulated by the tunnel router 40 among the packets received at the tunnel router 40 from the routing unit 44 to a designated transfer destination. Moreover, the transmitter 43 transmits a packet to the communication device 1 connected to the tunnel router 40, or the like.

The destination determination unit 45 checks the header (inner header) of the packet input from the receiver 42, and obtains the destination address of the packet. Also, when a notification message is input from the notification message generation unit 50, as will be described later, the destination determination unit 45 obtains the destination address of the packet in a similar manner to the above. The destination determination unit 45 uses the obtained destination address as a key to search the route table 48. The destination determination unit 45 obtains the address of a router to which the packet input from the receiver 42 is transferred and transfer destination network information from the route table 48. Moreover, the destination determination unit 45 may notify the decision unit 46 of the obtained information.

The decision unit 46 determines whether or not to encapsulate the packet according to the transfer destination network information. When the packet is not to be encapsulated, the decision unit 46 refers to the packet-length table 47, and obtains the Tunnel PMTU for a communication path to the destination network. When the length of a packet not to be encapsulated is equal to or less than the obtained Tunnel PMTU, the decision unit 46 outputs the packet to the transmitter 43, and notifies the transmitter 43 of the transfer destination.

On the other hand, when the packet is to be encapsulated, the decision unit 46 refers to the packet-length table 47, and obtains the Tunnel PMTU for a communication path to the destination network. An example of the packet-length table 47 is illustrated in FIG. 10. The decision unit 46 compares the length of the packet to be encapsulated with the Tunnel PMTU. When the length of the packet to be encapsulated is equal to or less than the Tunnel PMTU, the tunnel router 40 may transmit the encapsulated packet to the transfer destination network. When the length of the packet to be encapsulated is equal to or less than the Tunnel PMTU, the decision unit 46 outputs the packet to be encapsulated to the encapsulation unit 49. In this case, the destination determination unit 45 outputs information such as the destination to which the encapsulated packet is transferred and the Tunnel PMTU of the transfer destination network to the encapsulation unit 49. It is assumed that the encapsulation unit 49 stores the types of outer headers to be added to packets in advance. The encapsulation unit 49 adds an outer header to the packet input from the routing unit 44, and outputs the packet to the routing unit 51.

On the other hand, when the length of the packet to be encapsulated is greater than the Tunnel PMTU, the tunnel router 40 is not able to transmit the encapsulated packet to the transfer destination network. In this case, the decision unit 46 notifies the notification message generation unit 50 of the Tunnel PMTU of the transfer destination network 2 and of the inability to transfer the encapsulated packet. The decision unit 46 also outputs the packet input from the routing unit 44 to the notification message generation unit 50.

When the notification message generation unit 50 is notified of the inability to transfer the encapsulated packet, the notification message generation unit 50 generates a notification message. The notification message is, for example, an ICMP error message and a "Packet too big message", and includes information elements as described above with reference to FIG. 6. Note that values to be set to a type field, a code field, a checksum field, or the like of a notification message are stored in the notification message generation unit 50 in advance. The notification message generation unit 50 generates a notification message that includes an IP header included in the packet input from the encapsulation unit 49 and a portion of the data included in the packet together with the value of the MTU. The value of the Tunnel PMTU reported by the decision unit 46 is set to an MTU. Further, the notification message generation unit 50 obtains the IP address of the source of the packet with which a notification message is generated, and uses the obtained IP address of the source as the destination of a notification message. The notification message generation unit 50 outputs the generated notification message to the routing unit 44.

When a packet is input from the encapsulation unit 49, the routing unit 51 refers to the outer header of the encapsulated packet, and obtains a destination address. The routing unit 51 refers to the route table 55, and obtains the destination to which a packet is transferred. Moreover, the routing unit 51 refers to a destination recorded in the outer header and the route table 55 for the packet input from the receiver 52, and the routing unit 51 obtains information such as a transfer destination network. The routing unit 51 outputs the packet input from the encapsulation unit 49 or a packet to be transferred to another network to the transmitter 53, and notifies the transmitter 53 of the information of a transfer destination network or the like.

On the other hand, when a destination address in the outer header of the packet input from the receiver 52 matches the address of the tunnel router 40 that has received the packet, the routing unit 51 outputs the packet to the receive packet processing unit 56. The receive packet processing unit 56 determines whether or not the packet input from the routing unit 51 matches the packet of the notification message. The receive packet processing unit 56 outputs the notification message to the table update unit 57. Further, the receive packet processing unit 56 outputs a packet that is not a notification message to the decapsulation unit 58.

The table update unit 57 obtains the value of the MTU and the destination IP address of the failed-to-be-transferred packet from a notification message such as an IMCP error message. The table update unit 57 compares the obtained IP address with the prefix recorded in the packet-length table 47, and detects an entry that is associated with the prefix of the destination IP address of the failed-to-be-transferred packet. The table update unit 57 changes the value of the Tunnel PMTU recorded in the detected entry to the value of the MTU retrieved from a notification message. An example of the operation of the table update unit 57 will be described later. The decapsulation unit 58 removes the outer header from the packet input from the receive packet processing unit 56. The decapsulation unit 58 outputs a packet from which the outer header is removed to the routing unit 44.

It is assumed that the tunnel router 40 includes a memory, a processor, and a switch (not illustrated). The memory stores the packet-length table 47, the route table 48, and the route table 55. The processor operates as the notification message generation unit 50, the receive packet processing unit 56, and the table update unit 57. The switch operates as the routing unit 44 or the routing unit 51. The encapsulation unit 49 and the decapsulation unit 58 may be realized by hardware such as a chip.

Figure 11:
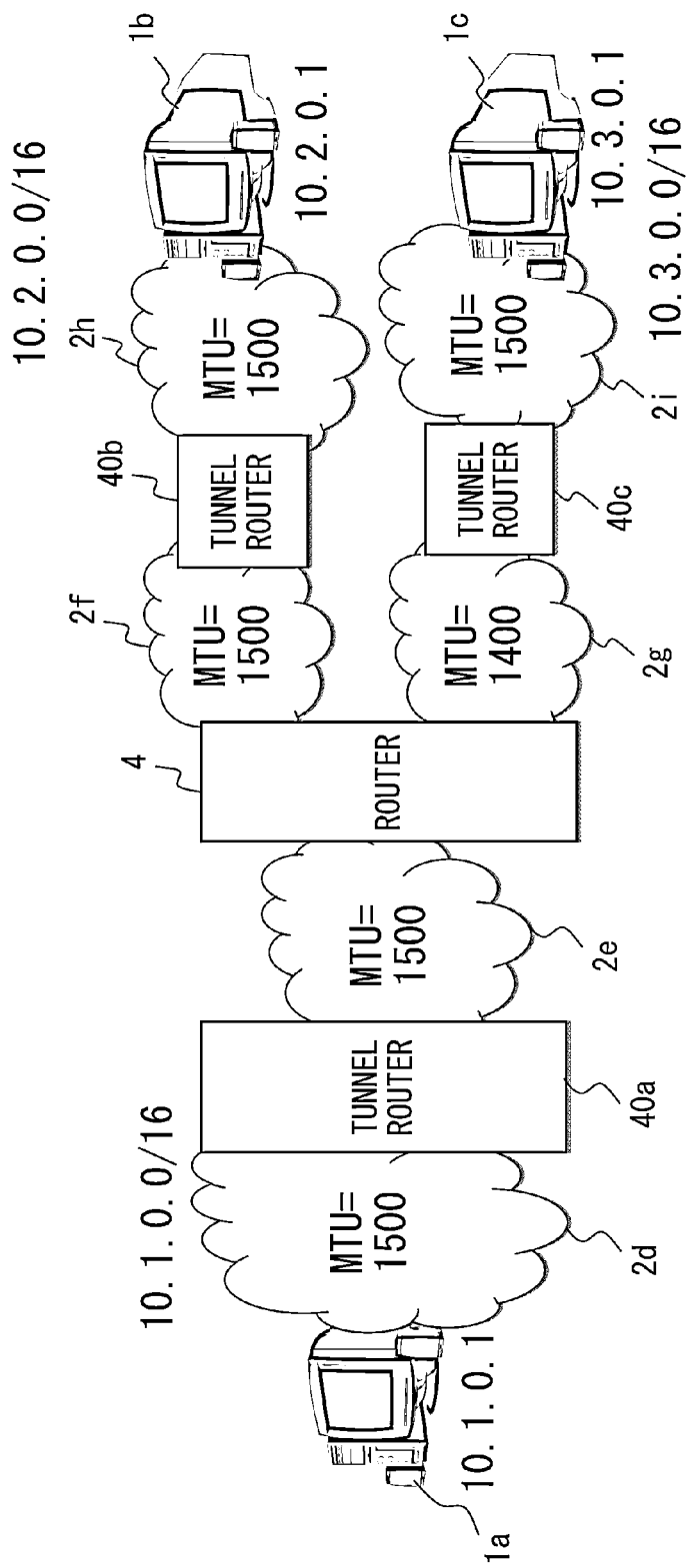
FIG. 11 illustrates an example of the network including tunnel routers.

FIG. 11 illustrates an example of the network including the tunnel routers 40. The network illustrated in FIG. 11 includes communication devices 1 (1a-1c), tunnel routers 40 (40a-40c), the router 4, and networks 2 (2d-2i). In the example of FIG. 11, it is assumed that the IP addresses of the communication devices 1 and the prefixes of the networks 2, 2h, and 2i are as follows.

IP address of communication device 1a: 10.1.0.1
IP address of communication device 1b: 10.2.0.1
IP address of communication device 1c: 10.3.0.1
Prefix of network 2d: 10.1.0.0/16
Prefix of network 2h: 10.2.0.0/16
Prefix of network 2i: 10.3.0.0/16

In the example of FIG. 11, the communication device 1a, the communication device 1b, and the communication device 1c belong to the network 2d, the network 2h, and the network 2i, respectively. The tunnel router 40a is connected to the networks 2d and 2e. The tunnel router 40b is connected to the networks 2f and 2h, and the tunnel router 40c is connected to the networks 2g and 2i. The router 4 is connected to the networks 2e, 2f, and 2g. Cases in which the communication device 1a transmits a packet to the communication device 1c in the network of FIG. 11, thereby changing the packet-length table 20 of FIG. 10, will be described below. It is assumed that IPv4 over IPv6 encapsulation is performed by the tunnel router 40a. In the following description, the combination of P and numbers, such as packet P11 and packet P12, will be used in order to enable distinctions among the packets generated by the packetizing unit 13.

Figure 12:
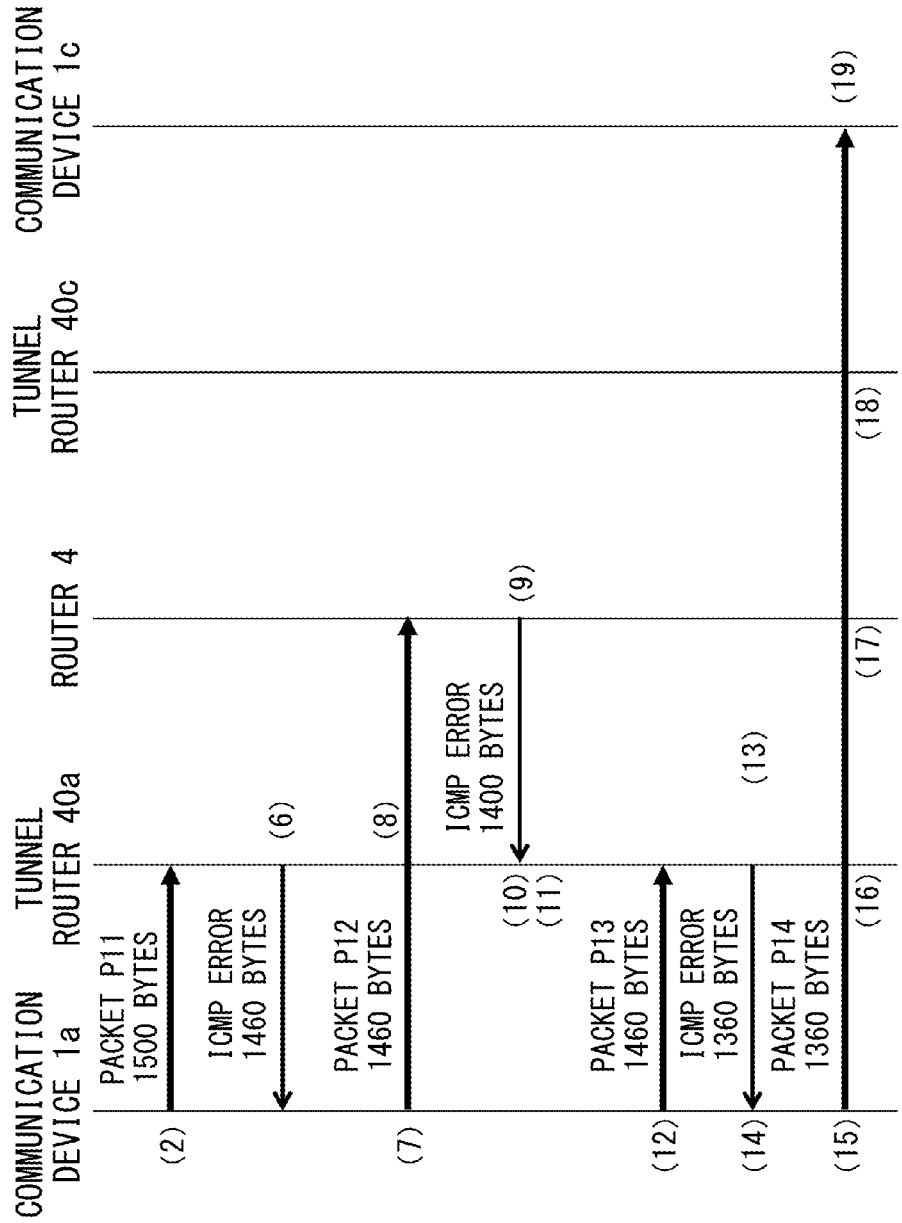
FIG. 12 illustrates an example of the sequence diagram of packets that are transmitted and received when a communication device 1a transmits a packet to a communication device 1c.

FIG. 12 illustrates an example of the sequence diagram of packets that are transmitted and received when the communication device 1a transmits a packet to the communication device 1c. The numbers in FIG. 12 indicate the procedure numbers in the following description. In the example of FIG. 12, it is assumed that notification messages are ICMP error messages.

(1) The tunnel router 40a is connected to the network 2e where MTU=1500 bytes, as illustrated in FIG. 11. When the tunnel router 40a starts operating, the table update unit 57 uses the MTU of the network 2e to set the initial value of the packet-length table 47. Here, it is assumed that the tunnel router 40a adds an IPv6 header of 40 bytes as an outer header in order to perform encapsulation of "IPv4 over IPv6" for a packet to be transferred to the network 2e. In that case, the encapsulated packet may be transferred to the network 2 when a packet before encapsulation is equal to or less than "1500−40=1460 (bytes)". A packet whose destination is a device included in one of the networks "10.2.0.0/16" and "10.3.0.0/16" is also transferred from the tunnel router 40a to the network 2e. Then, the table update unit 57 generates the packet-length table 47 of FIG. 10.

(2) It is assumed that the communication device 1a transmits a packet P11 to the communication device 1c. In this case, the communication device 1a transmits the generated packet in accordance with the length of the MTU of the network 2 to which the communication device 1a is connected. The communication device 1a is connected to the network 2d, and the MTU of the network 2d is 1500 bytes. Thus, the communication device 1a transmits a packet of 1500 bytes to the communication device 1c. Note that the communication device 1a performs communication by using an IPv4, and a packet P11 is a packet with an IPv4 header.

(3) The tunnel router 40a receives the packet P11 from the receiver 42. The receiver 42 outputs the packet P11 to the destination determination unit 45 and the decision unit 46. The destination determination unit 45 obtains a destination address from the IP header of the packet P11, and recognizes that the transfer destination of the packet P11 is the network 2e by referring to the route table 48.

(4) The decision unit 46 recognizes that a communication where an IPv6 is used is performed in the network 2e by referring to the information of a transfer destination network. The packet P11 is an IPv4 packet, and communication with an IPv6 is further performed in the network 2 to which the packet P11 is transferred. Thus, the decision unit 46 determines that encapsulation of "IPv4 over IPv6" is to be performed for the packet P11.

(5) Next, the decision unit 46 refers to the packet-length table 47, and obtains a Tunnel PMTU to be used for transmission to the network 2 to which the communication device 1c belongs. As illustrated in FIG. 10, at this stage, it is assumed that a Tunnel PMTU associated with the network 2 to which the communication device 1c belongs is 1460 bytes. The decision unit 46 compares the packet length of the packet P11 with the obtained Tunnel PMTU. The size of the packet P11 is 1500 bytes, and the size of the packet P11 is greater than the Tunnel PMTU. Thus, it is not possible for the tunnel router 40a to transmit the packet P11 to the transfer destination network 2e even when the packet P11 is encapsulated. For this reason, the decision unit 46 outputs the packet P11 and the value of the MTU of the network 2e to the notification message generation unit 50, thereby requesting the notification message generation unit 50 to generate a notification message.

(6) The notification message generation unit 50 generates a notification message N1, and outputs the generated notification message N1 to the transmitter 43 through the routing unit 44. The transmitter 43 transmits the notification message N1 to the communication device 1a.

(7) When the notification message N1 is received, the communication device 1a recognizes that a packet with 1460 bytes may be transmitted to the communication device 1c. Accordingly, the communication device 1a changes the size of the packet P12 addressed to the communication device 1c to 1460 bytes, and re-transmits the packet P12 to the communication device 1c.

(8) When the packet P12 is received, the tunnel router 40a performs the processes described in the procedures (3) and (4) for the packet P12. Next, the decision unit 46 compares the packet length of the packet P12 with the value of the Tunnel PMTU. Here, the packet length of the packet P12 is equal to the value of the Tunnel PMTU, and thus the packet P12 is output to the encapsulation unit 49. The encapsulation unit 49 adds an IPv6 header to the packet P12. The encapsulated packet P12 is transferred to the network 2e through the routing unit 51 and the transmitter 53.

(9) When the encapsulated packet P12 is received, the router 4 determines the transfer destination network 2 according to the destination address included in the outer header and the routing table stored in the router 4. The transfer destination of the encapsulated packet P12 is the network 2g. Next, the router 4 compares the length of the encapsulated packet P12 with the MTU of the network 2g. Whereas the size of the encapsulated packet P12 is 1500 bytes, as illustrated in FIG. 11, the MTU of the network 2g is 1400 bytes. For this reason, it is not possible for the router 4 to transfer the encapsulated packet P12. Thus, the router 4 generates an ICMP error message to notify the tunnel router 40b of the fact that the MTU is 1400 bytes.

(10) The tunnel router 40a receives the ICMP error message at the receiver 52. The receiver 52 outputs the ICMP error message to the routing unit 51. As the destination address of the ICMP error message is the tunnel router 40a, the routing unit 51 outputs the ICMP error message to the receive packet processing unit 56. As the input packet is an ICMP error message, the receive packet processing unit 56 outputs the ICMP error message to the table update unit 57.

(11) The table update unit 57 obtains the destination IP address of the failed-to-be-transferred packet and the value of the MTU from the ICMP error message. Here, the IP address 10.3.0.1/16 of the communication device 1c and the fact that the MTU is equal to or less than 1400 bytes in the network 2 that is included in the route to the communication device 1c are recognized. Next, the table update unit 57 calculates the length of the Tunnel PMTU by subtracting the length of an outer header from the MTU included in the ICMP error message. Here, the size of the outer header is 40 bytes, and thus the Tunnel PMTU is "1400−40=1360 bytes". The table update unit 57 records the calculated length of the Tunnel PMTU in the packet-length table 47. FIG. 13 illustrates an example of the packet-length table 47 changed by the table update unit 57.

(12) The tunnel router 40 does not notify the communication device 1a from which the packet is sent of the Tunnel PMTU even when the packet-length table 47 is changed. Accordingly, the communication device 1a recognizes that the packet P12 has failed to reach the communication device 10c when the communication device 1a does not receive an Ack message for the packet P12 within a certain period of time since the time at which the packet P12 was sent. In that case, the communication device 1a generates a packet P13 as the resent packet of the packet P12, and re-transmits the packet P13 to the communication device 1c. Because the communication device 1a has not received any notification message such as an ICMP error message, as illustrated in FIG. 12, the value of the PMTU that may be transmitted to the communication device 1c is not changed. Accordingly, the packet P13 is generated with a size of 1460 bytes in a similar manner to the packet P12.

(13) When the packet P13 is received from the communication device 1a, the tunnel router 40a handles the packet P13 and determines that the packet P13 is to be encapsulated, as described in the procedures (3) and (4) above. Further, the decision unit 46 refers to the packet-length table 47, and recognizes that the Tunnel PMTU used to transmit a packet to the network 2 to which the communication device 1c belongs is 1360 bytes. As the packet length of the packet P13 (1460 bytes) is greater than the Tunnel PMTU, the decision unit 46 requests the notification message generation unit 50 to generate a notification message.

(14) The notification message generation unit 50 generates a notification message N2, and outputs the generated notification message N2 to the transmitter 43 through the routing unit 44. The transmitter 43 transmits the notification message N2 to the communication device 1a.
Note that the fact that the tunnel MTU is 1360 bytes is recorded in the notification message N2 as an MTU.

(15) When the notification message N2 is received, the communication device 1a recognizes that a packet with 1360 bytes may be transmitted to the communication device 1c. Accordingly, the communication device 1a changes the size of the packet P14 addressed to the communication device 1c to 1360 bytes, and re-transmits the packet P14 to the communication device 1c.

(16) When the packet P14 is received, the tunnel router 40a performs the processes described in the procedures (3) and (4) for the packet P14. Next, the decision unit 46 compares the packet length of the packet P14 with the value of the Tunnel PMTU. Here, the packet length of the packet P14 is equal to the value of the Tunnel PMTU, and thus the packet P14 is output to the encapsulation unit 49. The encapsulation unit 49 adds an IPv6 header to the packet P14. The encapsulated packet P12 is transferred to the network 2e through the routing unit 51 and the transmitter 53.

(17) When the encapsulated packet P14 is received, the router 4 recognizes that the transfer destination network 2 is a network 2g, as described in the procedure (9) above. Moreover, the router 4 checks that the length of the encapsulated packet P14 is equal to or less than the MTU of the network 2g, and transfers the packet P14 to the network 2g.

(18) The tunnel router 40c receives the encapsulated packet P14 at the receiver 52. The receiver 52 outputs the encapsulated packet P14 to the routing unit 51. As the destination address of the outer header is the tunnel router 40c, the routing unit 51 outputs the encapsulated packet P14 to the receive packet processing unit 56. As the input packet is not a notification message, the receive packet processing unit 56 outputs the packet to the decapsulation unit 58. The decapsulation unit 58 decapsulates the packet input from the receive packet processing unit 56, and outputs the packet P14 to the routing unit 44. The routing unit 44 obtains an IP address 10.3.0.1/16 from the IPv4 header of the packet P14. As the tunnel router 40c is connected to the network 2i whose address is "10.3.0.0/16", the tunnel router 40c transmits the packet P14 to the communication device 1c in the network 2i.

(19) The communication device 1c receives the packet P14.

Figure 14:
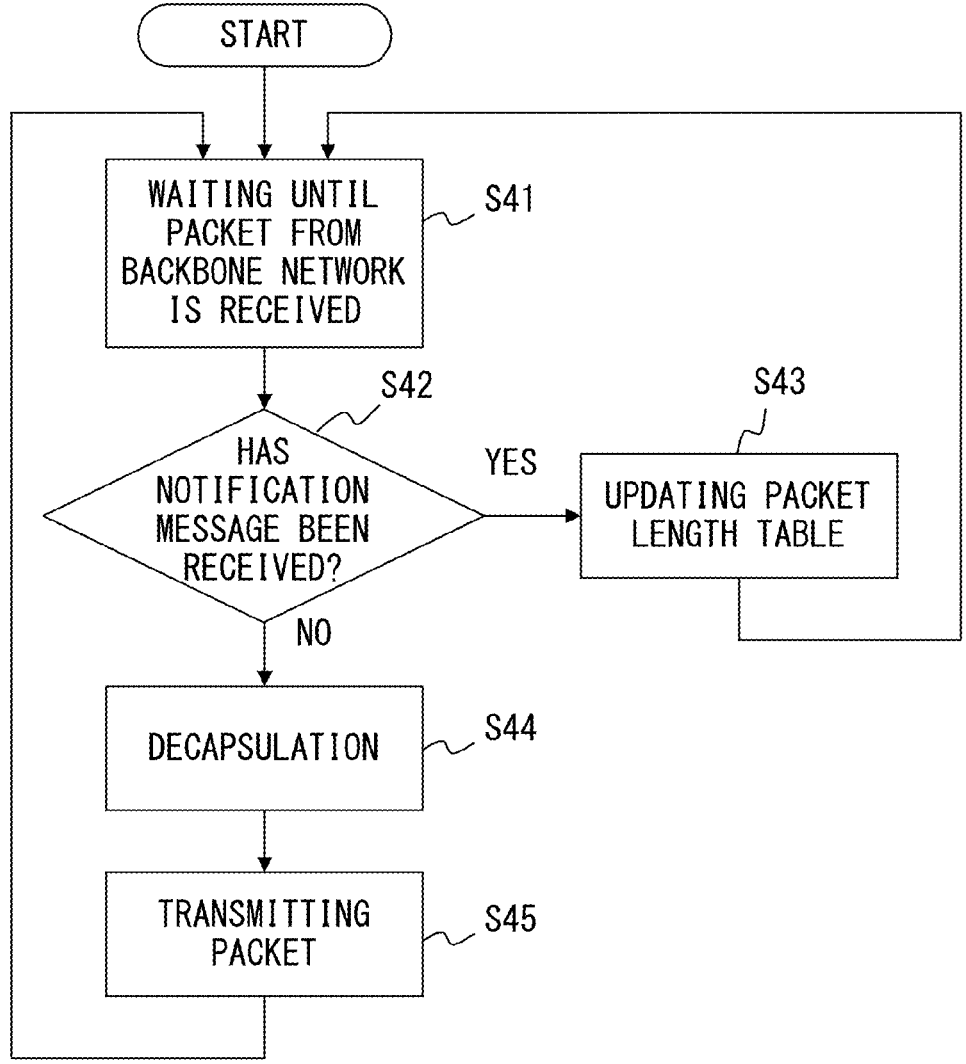
FIG. 14 is a flowchart illustrating an example of the operation of a tunnel router.

FIG. 14 is a flowchart illustrating an example of the operation of the tunnel router 40.

FIG. 14 illustrates the operations performed when the tunnel router 40 has received a packet and transfers the packet to a stub network from a backbone network side. In the example of FIG. 11, the network 2e is on the backbone network side, and the network 2d is on the stub network side, with reference to the tunnel router 40a. Moreover, the network 2g is on the backbone network side, and the network 2i is on the stub network side, with reference to the tunnel router 40c.

The receiver 52 waits until a packet from a backbone network is received (step S41). When the packet is received, the receiver 52 outputs the packet to the routing unit 51. The routing unit 51 outputs a packet whose destination is the tunnel router 40 to the receive packet processing unit 56. The receive packet processing unit 56 checks whether the received packet is a notification message (step S42). When a notification message is received, the receive packet processing unit 56 outputs the notification message to the table update unit 57. The table update unit 57 obtains the value of the MTU from the notification message, and updates the packet-length table 47 (step S43). On the other hand, when the packet input to the receive packet processing unit 56 is not a notification message, the receive packet processing unit 56 outputs the packet to the decapsulation unit 58. The decapsulation unit 58 decapsulates the packet by removing the outer header of the packet input from the receive packet processing unit 56 (step S44). The decapsulated packet is transmitted from the transmitter 43 to the destination recorded in the inner header through the routing unit 44 (step S45). After step S43 or S45 is performed, the processes subsequent to step S41 are repeated.

FIG. 15 is a flowchart illustrating an example of the operation of the tunnel router 40.

FIG. 15 illustrates the operations performed when the tunnel router 40 has received a packet from a stub network and transfers the packet to a backbone network side. The receiver 42 waits until a packet from a stub network is received (step S51). When a packet is received, the receiver 42 outputs the packet to the routing unit 44. The decision unit 46 recognizes that the received packet is to be encapsulated according to transfer destination information. Further, the decision unit 46 refers to the packet-length table 47, and obtains the Tunnel PMTU up to the destination network to which the packet is transferred (step S52). When the packet length exceeds the Tunnel PMTU, the decision unit 46 determines that it is not possible to transfer the encapsulated packet, and notifies the notification message generation unit 50 of a result of the determination. The notification message generation unit 50 generates a notification message, and transmits the notification message through the transmitter 43 back to the source from which the received packet is transmitted ("No" in step S53, step S54). On the other hand, when the receive packet length is equal to or less than the Tunnel PMTU, the receive packet is output to the encapsulation unit 49 and is encapsulated ("Yes" in step S53, step S55). The encapsulated packet is transmitted to a backbone network side through the routing unit 51 and the transmitter 53 (step S56). The processes in steps S51-S56 are repeated until the power source of the tunnel router 40 is cut off.

Note that the packet-length table 47 provided for the tunnel router 40 is also initialized when the power source of the tunnel router 40 is turned on or when a specified period of time has passed since the packet-length table 47 was initialized, in a similar manner to the packet-length table 20. The packet-length table 47 is initialized by the table update unit 57, and how initialization is performed is similar to the method described above with reference to FIG. 7A and FIG. 8B.

As described above, it is possible to record a Tunnel PMTU for each network in the packet-length table 47 provided for the tunnel router 40. If a Tunnel PMTU is recorded for every network, it becomes possible to reduce the number of entries used for the storage of a Tunnel PMTU compared with when the storage capability to record a Tunnel PMTU that corresponds to the destination of a packet relayed by the tunnel router 40 is recorded for each destination.

An enormous number of packets are handled by a router, and there are various destinations. The number of types of destinations to which packets are relayed by the tunnel router 40 is greater than that of a single communication device 10 such as a server or a host. Accordingly, the number of entries in a table where Tunnel PMTUs are stored tends to be enormous when a Tunnel PMTU is recorded by a tunnel router for every destination, and thus it takes a long time to search for a Tunnel PMTU when a packet is transferred. In the second embodiment, it is possible to decrease the number of entries that are recorded in the packet-length table 47 by recording a Tunnel PMTU for every network in the packet-length table 47 provided for the tunnel router 40. As a result, the search time of a Tunnel PMTU at the tunnel router 40 becomes shorter, and the process of transfer becomes faster.

When the tunnel router 40 includes the packet-length table 47, the capacity of a memory used for the packet-length table 47 becomes smaller compared with when a Tunnel PMTU is recorded for every destination device. Accordingly, the possibility of failure to record a Tunnel PMTU due to a memory shortage is reduced. Moreover, the capacity of a memory to be installed in the tunnel router 40 may be reduced compared with when a Tunnel PMTU is recorded for every destination device. Further, the number of times the tunnel router 40 is reset is reduced as there is a reduced possibility of failure to record a Tunnel PMTU due to a memory shortage occurring at the tunnel router 40, and the maintenance of the tunnel router 40 also becomes simplified.

Third Embodiment

In the third embodiment, cases will be described in which the tunnel router 40 is used in the communication using Stateless Automatic IPv4 over IPv6 Tunneling (SA46T). For example, it is assumed that the network 2d from among the networks of FIG. 11 operates with an IPv4 and the other networks 2e-2i operate with an IPv6. In this case, the tunnel router 40a is provided with the packet-length table 47 in which a Tunnel PMTU is recorded in association with the prefix (SA46T prefix) of the IPv6 address of the destination network.

FIG. 16 illustrates an example of the packet-length table 47 used in the third embodiment. In the packet-length table 47 used in the third embodiment, a Tunnel PMTU is associated with an "SA46T prefix" by which the destination network of a packet is identified. The router 40a adds an IPv6 header to a packet when an IPv4 packet is transferred to the network 2h or 2i in which communication is being performed with an IPv6. The value of the Tunnel PMTU is calculated by subtracting the length of an IPv6 header from the maximum packet length with which each of the networks 2h and 2i is reachable.

How the packet-length table 47 is created and how the packet-length table 47 is modified are similar to the ways described in the second embodiment. However, in the present embodiment, the tunnel router 40a receives a "Packet too big message" as a notification message.

As described in the present embodiment, the number of entries used for the storage of a Tunnel PMTU may be reduced if a Tunnel PMTU is recorded in association with "SA46T prefix", compared with when a Tunnel PMTU is recorded for every destination. Accordingly, the length of time to search for a Tunnel PMTU may be reduced.

<Other Matters>

Note that the embodiments are not limited to the ones described above, but various modifications may be made. Some examples of such modifications will be described below.

Figure 17:
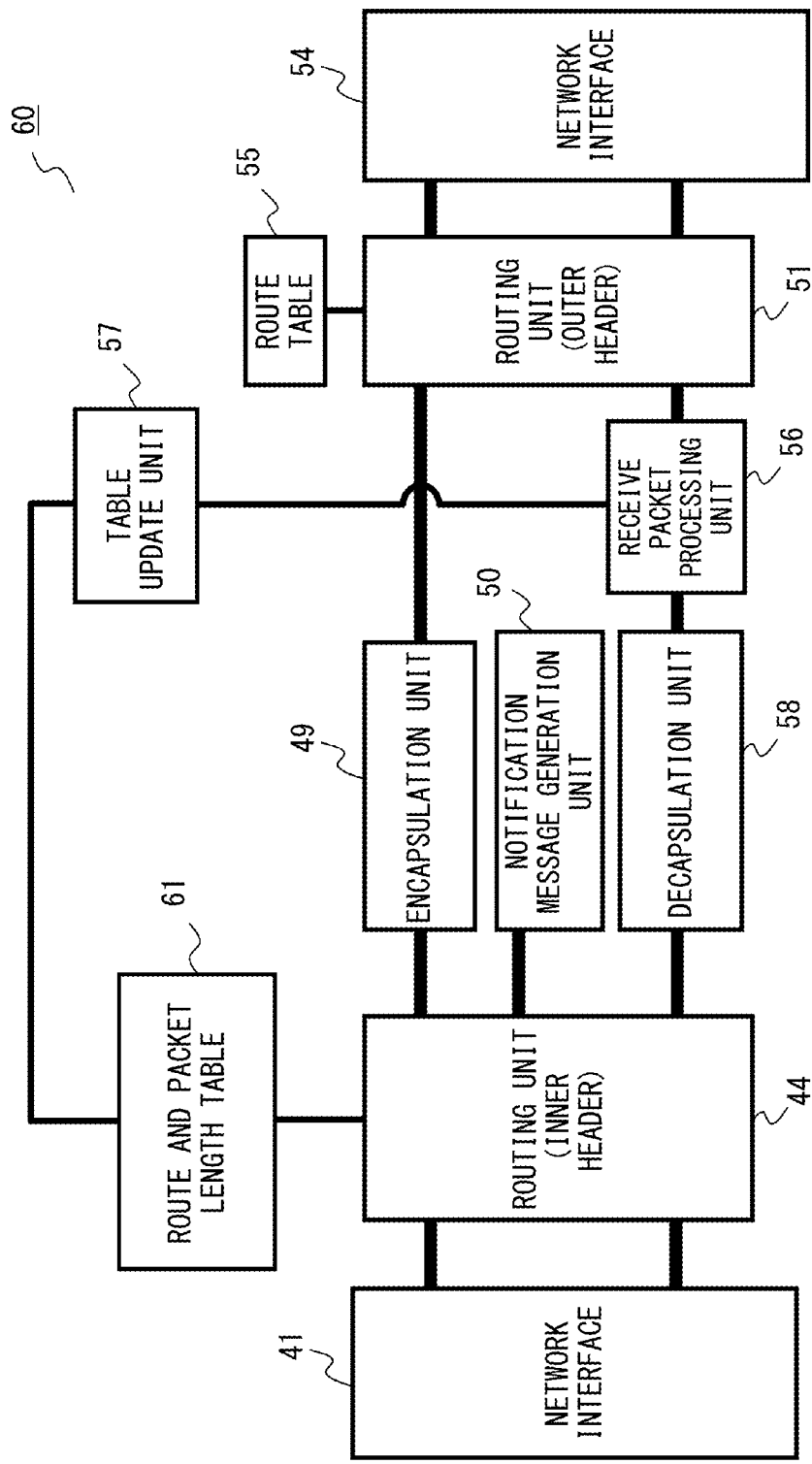
FIG. 17 illustrates an example of the functional composition of a tunnel router when a packet-length table and a route table are integrated.

The packet-length table 47 stores a Tunnel PMTU for every destination network, and thus it is also possible to expand the routing table of a router and to integrate the packet-length table 47 and the route table 48. FIG. 17 illustrates an example of the configuration of a tunnel router 60 when the packet-length table 47 and the route table 48 are integrated. The tunnel router 60 includes the network interfaces 41 and 54, the routing units 44 and 51, the encapsulation unit 49, the notification message generation unit 50, the route table 55, the receive packet processing unit 56, the table update unit 57, the decapsulation unit 58, and a route and packet-length table 61. The route and packet-length table 61 is a table where the packet-length table 47 and the route table 48 are integrated. An example of the route and packet-length table 61 is illustrated in FIG. 18. How a Tunnel PMTU is changed in the route and packet-length table 61 is similar to the way described in the second and third embodiments. Due to the integration of the packet-length table 47 and the route table 55 as illustrated in FIG. 18, a route and a Tunnel PMTU are searched simultaneously, and the processing efficiency of the tunnel router 60 is improved compared with that of the tunnel router 40.

Figure 19:
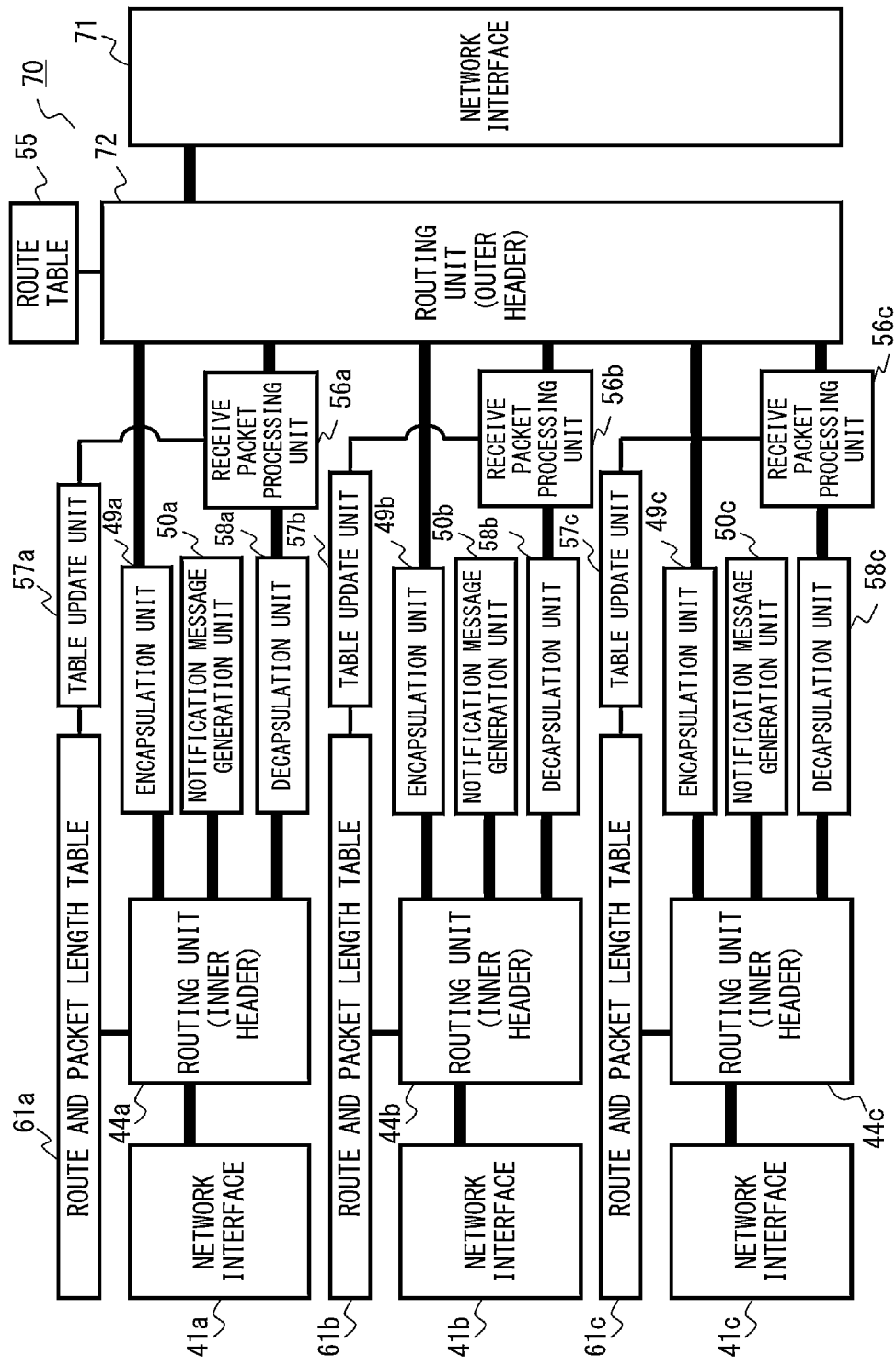
FIG. 19 illustrates an example of the functional composition of a tunnel router.

FIG. 19 illustrates an example of the functional composition of a tunnel router 70. The tunnel router 70 includes a plurality of interfaces that transmit and receive a packet to be encapsulated. In other words, the tunnel router 70 uses a network interface 71 and a routing unit 72, and the route table 55 for the routing of the encapsulated packet. A packet to be encapsulated is processed by network interfaces 41 (41a-41c), routing units 44 (44a-44c), and encapsulation units 49 (49a-49c). When it is not possible to transfer the encapsulated packet, the notification message generation unit 50 connected to the network interface 41 to which a packet that is determined to be not possible to be transferred is input generates a notification message. The packet received through the network interface 71 is processed by receive packet processing units 56 (56a-56c), table update units 57 (57a-57c), decapsulation units 58 (58a-58c), and route and packet-length tables 61 (61a-61c). The tunnel router 70 may be used to realize, for example, a Virtual Private Network (VPN).

The packet-length table 20, the packet-length table 47, the route and packet-length table 61, the route tables 48 and 55, or the like may use an associative memory, and if these tables are generated by hardware, they may be configured in such a manner that a high-speed search is possible.

When a default route is set to a route table, the packet-length table 20 or the packet-length table 47 may be modified so as to store a PMTU for every host in regard to a destination for which routing is performed by using the default route.

In the second and third embodiments or the embodiment described with reference to FIGS. 17-19, cases in which a tunnel router is used have been described. However, a relay apparatus that does not perform encapsulation such as the router 4 may include the packet-length table 20. In such a case, a relay apparatus obtains a PMTU stored in the packet-length table 20 in association with the prefix of the transfer destination network, and compares the PMTU with the length of a packet to be transferred.

As described above, a period of time a transmission source device takes to search for the PMTU associated with a destination device is shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device, comprising:
a memory configured to hold a packet-length table storing, in association with an identifier of a network, a length of a packet to be transmitted to a device belonging to the network;
a transmitter configured to obtain a first length from the packet-length table, and to transmit a certain packet to a destination device when a second length is equal to or less than the first length, the first length being a length associated with a network to which the destination device belongs, and the second length being a length of the certain packet;
a receiver configured to receive a notification message indicating an address of the destination device and a third length, when the second length is greater than the third length, the third length being a maximum packet length corresponding to a maximum length of a packet that is able to be transmitted to a network included in a route leading to the destination device; and
a processor configured to update the first length in the packet-length table to the third length,
wherein
the packet-length table stores a routing prefix of an address of the destination device and a length of a packet that is able to be transmitted to a network designated by the routing prefix in association with each other,
and
the processor changes a value of packet length associated with the routing prefix of the address of the destination device to the maximum packet length.

2. A relay apparatus that relays a packet transmitted from a transmission source device, the relay apparatus comprising:
a receiver configured to receive a relay packet;
a memory configured to hold a packet-length table storing, in association with an identifier of a network including a destination device which is a destination of the packet, a length of a packet that is able to be transmitted to a device belonging to the network;
a processor configured to decide a transfer destination network to which the relay packet is to be transferred, and to determine that the relay packet is to be transferred when a first length is less than a second length, the first length being a length of the relay packet, and the second length being a length stored in association with an identifier that identifies the network including the destination device; and
a transmitter configured to transmit the packet determined to be transferred to the transfer destination network, wherein the receiver receives a notification message indicating an address of the destination device and a third length when the first length is greater than the third length, the third length being a maximum length corresponding to a maximum length of a packet that is able to be transmitted to a network included in a route leading to the destination device, and the second length in the packet-length table is updated to the third length, wherein the packet-length table stores a routing prefix of an address of the destination device and a length of a packet that is able to be transmitted to a network designated by the routing prefix in association with each other, and the processor changes a value of packet length associated with the routing prefix of the address of the destination device to the maximum packet length.

3. The relay apparatus according to claim 2, wherein the processor generates a notification message indicating that a length of the relay packet is greater than the third length and indicating a value of the third length when the length of the relay packet is greater than the maximum packet length, and the transmitter transmits the notification message to the transmission source device.

4. The relay apparatus according to claim 3, wherein the relay packet is generated according to a first protocol, and when a second protocol different from the first protocol is used in the transfer destination network, the processor adds a header for performing a process with the second protocol to the relay packet, and the packet-length table stores a value calculated by subtracting a length of the header from the maximum packet length in association with the identifier that identifies the network including the destination device.

5. A communication method in which a process is performed by a relay apparatus that relays a packet transmitted from a transmission source device, the process comprising:

receiving the packet;

deciding a transfer destination network to which the packet is to be transferred;

determining that the packet is to be transferred when a first length is less than a second length, the first length being a length of the packet, and the second length being a length stored in association with an identifier that identifies a network including a destination device which is a destination of the packet;

transmitting the packet determined to be transferred to the transfer destination network;

receiving a notification message indicating an address of the destination device and a third length when the first length is greater than the third length, the third length being a maximum packet length corresponding to a maximum length of a packet that is able to be transmitted to a network included in a route leading to the destination device; and updating the second length to the third length, wherein the packet-length table stores a routing prefix of an address of the destination device and a length of a packet that is able to be transmitted to a network designated by the routing prefix in association with each other, and the processor changes a value of packet length associated with the routing prefix of the address of the destination device to the maximum packet length.

* * * * *